June 16, 1953 — H. T. BRIGHT — 2,641,889
CONTROL MEANS FOR POWER LAWN MOWERS
Filed Aug. 14, 1948 — 4 Sheets-Sheet 1
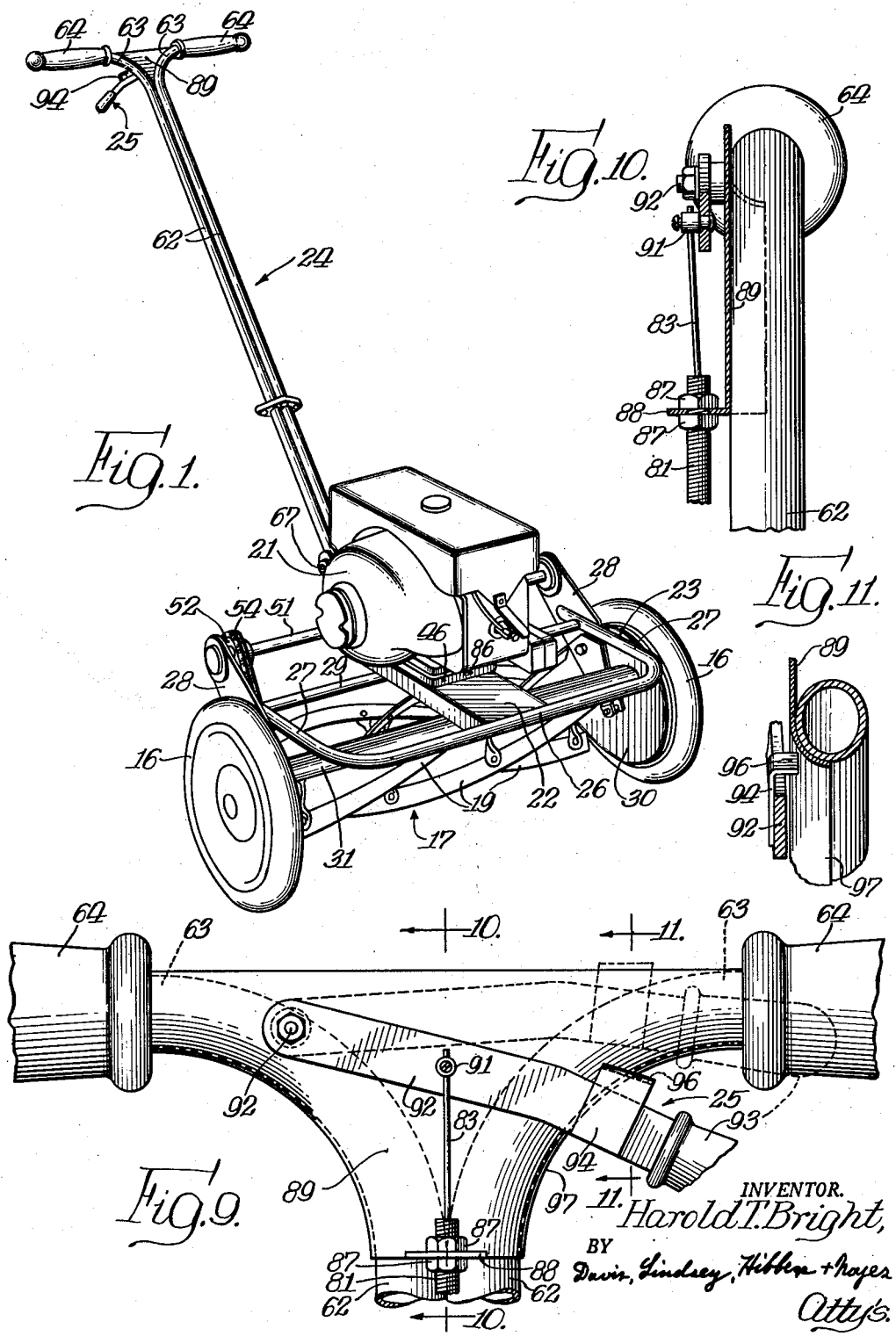
INVENTOR.
Harold T. Bright,
BY Davis, Lindsey, Hibben + Hayes
Attys.

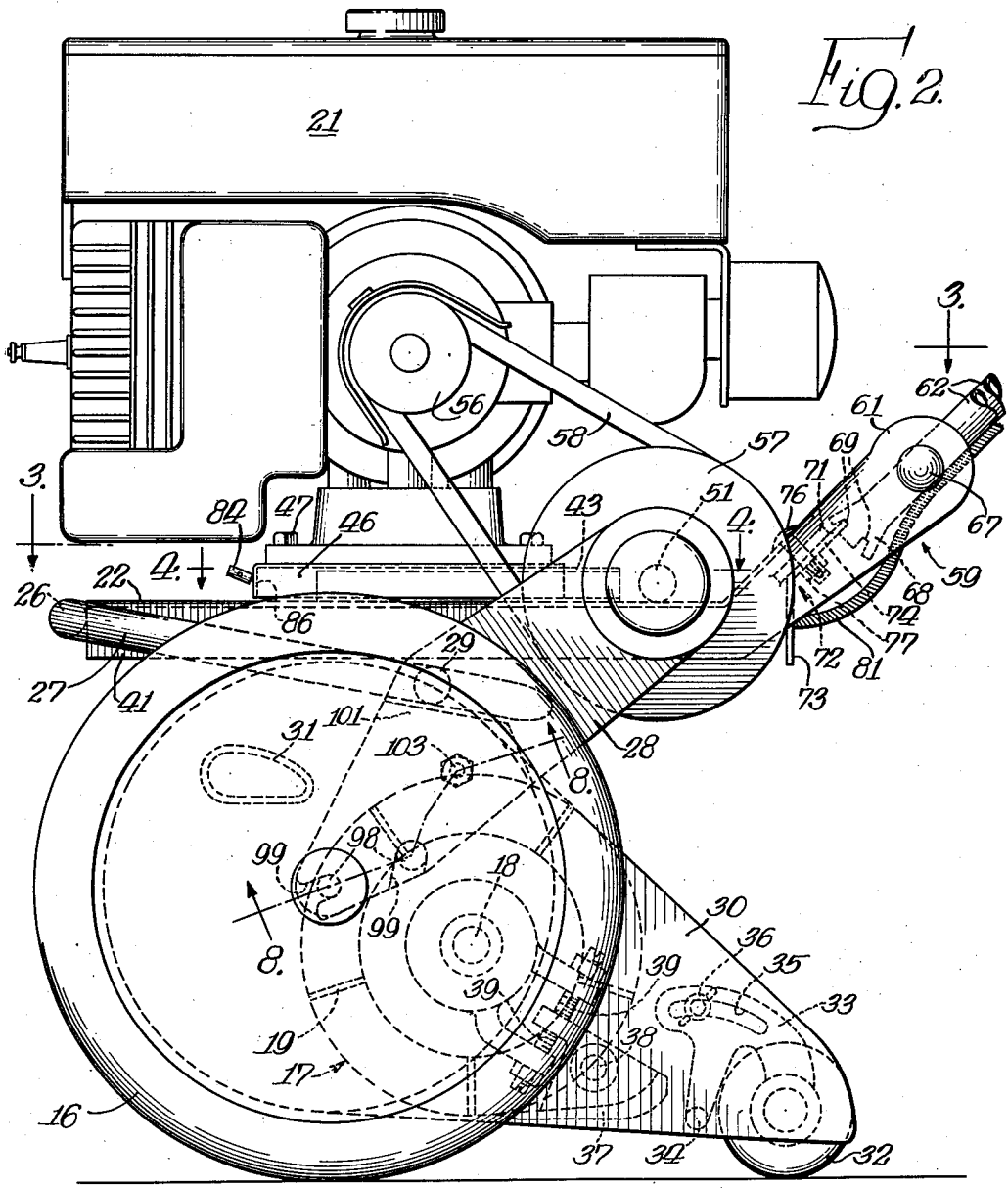

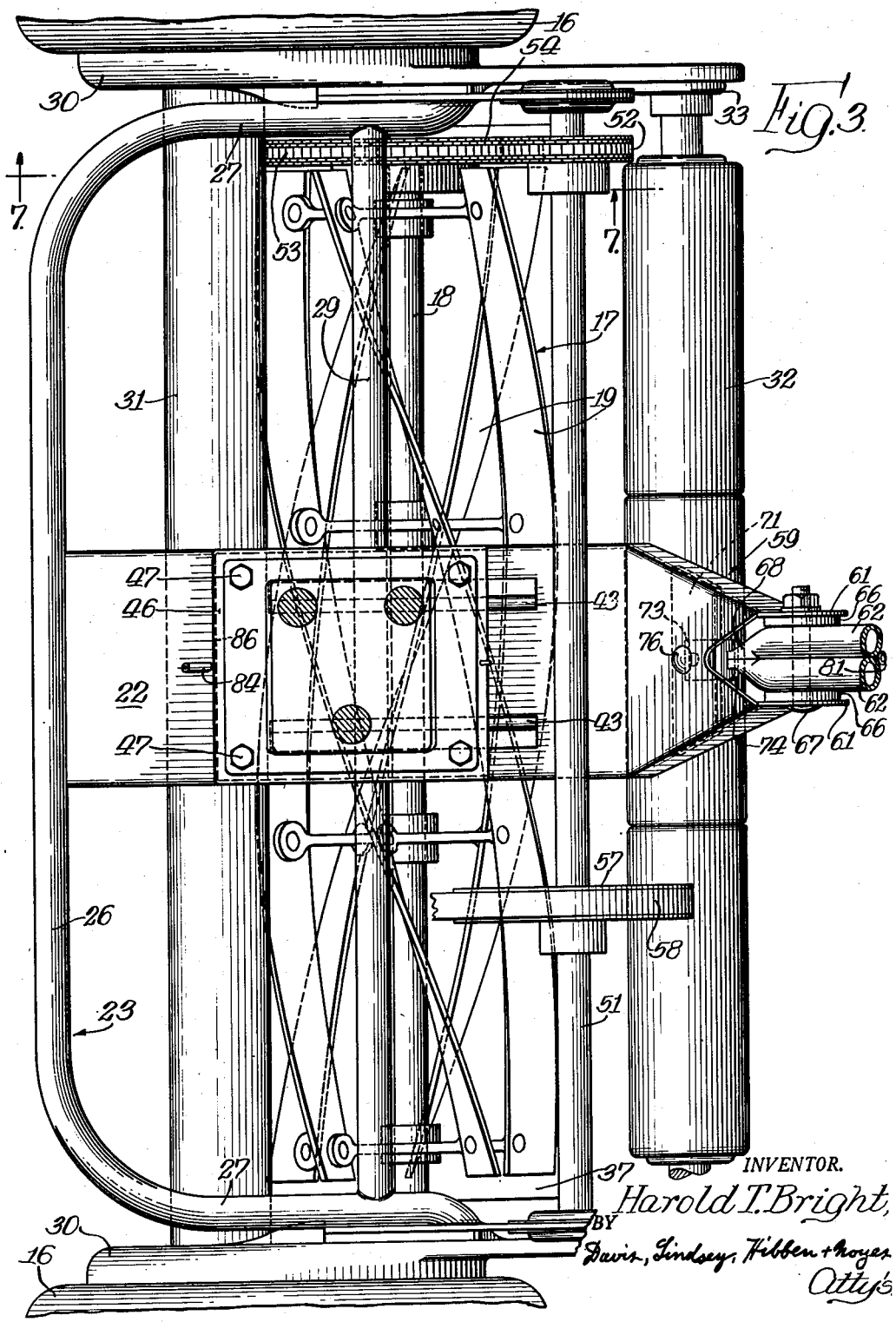

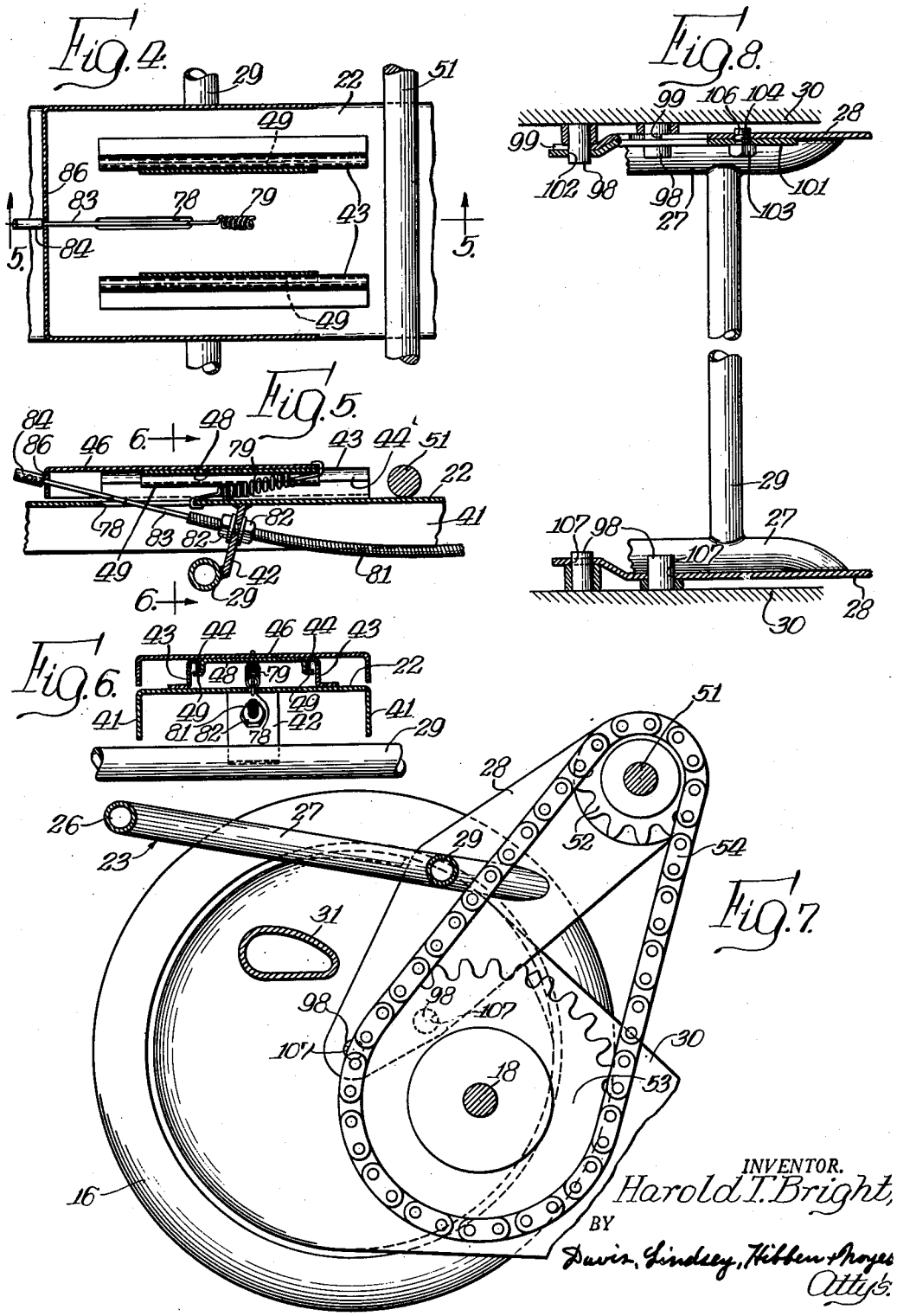

Patented June 16, 1953

2,641,889

UNITED STATES PATENT OFFICE 2,641,889

CONTROL MEANS FOR POWER LAWN MOWERS

Harold T. Bright, Elmhurst, Ill., assignor to King Pneumatic Tool Company, Chicago, Ill., a corporation of Illinois Application August 14, 1948, Serial No. 44,352

7 Claims. (Cl. 56—26)

This invention relates to power operated lawn mowers of the type having a source of power such as an internal combustion engine or an electric motor.

For convenient and flexible manipulation of a power operated lawn mower it is necessary that the mower be provided with some simple means of disconnecting the motor from the cutting unit whenever desired. In an electrically driven mower this may be accomplished by means of a suitable control switch for starting and stopping the electric motor, although in some cases starting of the electric motor under heavy load may be undesirable. In a power lawn mower having gasoline motor or other type of internal combustion engine, it is neither convenient nor feasible to stop and start the motor every time it is desired to interrupt the operation of the cutting unit. In the past, power lawn mowers have been equipped with clutches or idler pulley arrangements to meet this problem.

A primary object of my invention is to provide, in a power lawn mower, a simple and convenient control means for positioning the power unit and cutting unit in and out of driving relation with respect to each other without the necessity of stopping and starting the motor.

A further object of the invention is to provide a power lawn mower in which the power unit and cutting unit may be positioned in and out of driving relation with respect to each other without the necessity of providing a clutch or idler or tilting or moving the handle of the mower.

A still further object of the invention is to provide, in a power lawn mower having a belt drive between the power unit and the cutting unit, novel means for regulating the tension of the belt drive.

Another object of the invention is to provide a power lawn mower in which the weight of the motor is utilized to give traction to the wheels of the mower.

Still another object of the invention is to provide a power lawn mower having a readily accessible control lever mounted on the handle of the device for positioning the power unit in and out of driving relation with the cutting unit.

An additional object of the invention is to provide a power lawn mower in which the power unit may be readily and simply detached from the cutting unit.

Other objects and advantages of the invention will become evident from the following detailed description of the invention and the accompanying drawings, in which:

Fig. 1 is a perspective view of a power lawn mower embodying the features of my invention;

Fig. 2 is an enlarged fragmentary side elevational view of the mower looking from the right-hand side as viewed in Fig. 1;

Fig. 3 is a plan view of the device with the motor removed and taken along the line 3—3 of Fig. 2;

Fig. 4 is a horizontal sectional view taken along the line 4—4 of Fig. 2;

Fig. 5 is a sectional view taken along the line 5—5 of Fig. 4;

Fig. 6 is a sectional view taken along the line 6—6 of Fig. 5;

Fig. 7 is a sectional view taken along the line 7—7 of Fig. 3;

Fig. 8 is a sectional view taken along the line 8—8 of Fig. 2;

Fig. 9 is an enlarged fragmentary face view of the outer end of the handle of the device;

Fig. 10 is a sectional view of the handle taken along the line 10—10 of Fig. 9; and Fig. 11 is a sectional view of the handle taken along the line 11—11 of Fig. 9.

Briefly, the control feature of my invention comprises a slidable support for the lawn mower motor having spring means normally urging the motor into driving relation with the cutting unit. Cable means, such as a Bowden wire, is operably secured to the slidable support and extends to a control lever pivotally mounted on the handle of the mower for moving the support and the motor out of driving relation with the cutting unit. The control lever is provided with a clip or retaining member adapted to coact with a portion of the handle structure for releasably holding the lever in non-driving position. The power unit is preferably mounted on the cutting unit by means of depending brackets which detachably engage side members on the cutting unit, at least one of the brackets being rigidly but removably secured to the corresponding side member.

Referring now to the drawings, which illustrate merely by way of example one embodiment of my invention, the cutting unit of the device comprises a pair of traction wheels 16 and a bladed cutting reel 17 having a central shaft 18 (Fig. 3) and a plurality of ribbon-like blades 19 mounted thereon. The cutting reel 17 is journalled between the wheels 16 and rearwardly of the axis thereof as hereinafter described. The power unit is illustrated as a gasoline engine or motor 21 supported on an elongated base 22 which is in turn secured to a supporting framework or cradle indicated generally at 23 in Fig. 1. It will be understood that an electric motor may also be used in place of the gasoline motor shown, and the term "motor" as hereinafter used, both in the specification and claims, is intended to cover either type of motor. The framework 23 is detachably mounted above the cutting unit by means described hereinafter in detail. An elongated handle structure 24 extends outwardly from the framework 23 and has mounted adjacent its outermost end a control lever 25 for operating the novel control mechanism of my invention.

The supporting framework 23 for the power unit comprises a generally U-shaped tubular frame having a central portion 26 and parallel legs or side portions 27 integral therewith. The ends of the legs 27 are secured, as by welding, to the inner faces of a pair of spaced, parallel, plate-like side brackets 28 having portions projecting above and below the legs 27. A tubular cross member 29 extends between the legs 27 adjacent the ends thereof and parallel to the central portion 26.

The traction wheels 16 are rotatably mounted on the outer faces of a pair of upright, laterally spaced, parallel side members 30 comprising part of the cutting unit. The ends of the shaft 18 of the reel 17 are journalled at the inner faces of the side members 30, and the lower depending portions of the side brackets 28 are detachably mounted on the inner faces of the side members 30 by means hereinafter described in detail. A tubular shrub guard 31 extends between the side members 30 forwardly of the cutting reel 17. A three-section roller 32 (Fig. 3) is rotatably mounted between the side members 30 rearwardly of the wheels 16 and the reel 17 by means of a pair of roller arms 33 (Fig. 2) each pivotally secured at 34 to the corresponding side member 30. The roller arms 33 are each adjustable relative to the side members 30 by means of a slotted portion 35 and a wing nut and screw 36 for pivoting the cutting unit about the axis of the wheels 16 and thereby regulating the effective cutting height of the device. A knife bar or cutter bar 37 (Fig. 2) is pivotally secured, as at 38, between the side members 30 and a pair of opposed screws 39 are provided at each end of the bar 37 for regulating the degree of contact with the revolving blades 19 of the reel 17.

The base 22 has depending skirt portions 41 along its longitudinal sides and is disposed transversely of the axis of the wheels 16 and the reel 17, the forward end of the base 22 being secured, as by welding, to the central portion 26 of the U-shaped frame. The base 22 is also supported on the framework 23 by means of a depending plate 42 secured to the underside of the base 22 and to the cross member 29 (Fig. 5). A pair of spaced, parallel, elongated rails 43 are mounted longitudinally on the base 22, the upper edges of the rails being bent downwardly as at 44 (Fig. 6). A supporting plate or carriage 46 having the motor 21 fastened thereto, as by screws 47, is slidably disposed on the rails 43 for longitudinal movement relative to the base 22. A guide member or plate 48 is secured to the underside of the carriage 46 and has its longitudinal edges bent downwardly and outwardly, as at 49, to slidably engage the downturned edges 44 of the rails 43 for guiding the sliding movement of the carriage 46 and for retaining the same in supporting relation on the rails 43.

Rearwardly and upwardly of the cutting reel 17 and the base 22 is a drive shaft or jack shaft 51 journalled between the side brackets 28 adjacent the uppermost ends thereof (Fig. 2) and parallel to the axis of the wheels 16. The shaft 51 is drivingly connected to the cutting unit by means of a sprocket wheel 52 (Fig. 7) keyed to the shaft 51, a larger sprocket wheel 53 mounted on the shaft 18 of the cutting reel 17, and a chain drive 54 passing around the sprocket wheels 52 and 53. The traction wheels 16 are driven by means of pinion gears (not shown) at the ends of the shaft 18 and adapted to mesh with integral gears (not shown) within the traction wheels 16. The drive shaft 51 is operably connected with the motor 21 by means of a driving pulley 56 on the crank shaft of the motor 21, a driven pulley 57 keyed to the shaft 51, and a belt drive 58 between the two pulleys.

Rearwardly of the motor 21, the base 22 and its skirt portions 41 are tapered and bent upwardly to form an inclined handle-mounting portion or fork 59 having a pair of parallel spaced ears 61 (Figs. 2 and 3). The handle structure 24 comprises a pair of elongated tubular members 62 secured together along their length to form a shank portion and branching outwardly at the upper ends thereof to form oppositely extending handle members or gripping members 63 having rubber handle grips 64 (Fig. 9). A bearing plate 66 is secured to the outside of each of the tubular members 62 adjacent their lower ends (Fig. 3). The handle 24 is pivotally attached to the fork 59 between the ears 61 by means of a pin or screw 67 extending through a plurality of aligned apertures provided in the ears 61, the bearing plates 66, and the tubular members 62. The tubular members 62 are flattened together at their lower extremities to form a tongue portion 68, and a plurality of endwise slots or notches 69 are provided in the flattened tongue 68. A transverse cross-plate 71 is secured at the underside of the handle-mounting portion 59 between the depending sides or skirt portions 41. A latch member 72 having a depending operating portion or leg 73 and an angularly extending leg 74 is adjustably attached to the cross plate 71 by means of a screw 76 extending through suitable apertures in the handle-mounting portion 59, the cross-plate 71, and the leg 74. By means of a wing nut 77 on the screw 76, the latch 72 may be secured in place with the outer end of the leg 74 in engagement with one of the notches 69 for retaining the handle 24 in any desired operating position. The position of the handle relative to the framework 23 may be adjusted by loosening the wing nut 77, swinging the leg 74 of the latch 72 outwardly by manipulation of the leg 73, pivotally moving the handle 24 to the desired position, and reseating the leg 74 of the latch 72 in the appropriate notch 69.

A longitudinal slot 78 (Figs. 4 and 5) is provided in the base 22, and a coil spring 79 having hooked ends engages the rear end of the slot 78 and the rear end of the carriage 46 thereby normally urging the carriage 46 toward the forward end of the base 22. A control cable is provided for manually moving the carriage 46 in the opposite direction relative to the base 22, i. e. in opposition to the force exerted by the spring 79. The control cable comprises a Bowden wire having an outer stationary cable portion 81 extending at one end through an aperture in the plate 42 and rigidly secured thereto, as by a pair of nuts 82, and having an inner movable control wire 83 extending upwardly through the slot 78 and operably connected by means of a retainer fitting 84 to a depending skirt portion 86 extending downwardly from the forward end of the carriage 46. The cable 81 and the inner wire 83 extend rearwardly below the base 22 and upwardly along the handle structure 24. The opposite end of the cable 81 is rigidly attached by means of a pair of nuts 87 to a lug or bracket portion 88 (Fig. 9) projecting outwardly from a generally triangular face plate 89 mounted flatwise on the handle 24 at the juncture of the shank with the handle members 63. The opposite end of the control wire 83 extending beyond the end of the cable 81 is secured, as by a fitting 91, to the control lever 25 at an intermediate portion thereof. The lever 25 is pivotally attached at one end thereof, as by a screw 92, to the face plate 89 between the handle members 63 and adjacent the inner end of the left-hand handle grip 64 as viewed in Fig. 9. A grasping or operating portion 93 is provided at the other end of the lever 25 beneath the right-hand handle grip 64 (as viewed in Fig. 9) whereby the lever 25 may be readily operated by the same hand of the operator that grasps the right-hand handle grip 64.

A generally L-shaped clip or retaining member 94 (Fig. 9) is mounted on the control lever 25 adjacent the grasping portion 93 and projects upwardly therefrom. The clip 94 is provided with an outwardly extending leg portion 96 which is adapted to slip over and engage the upper linear edge of the face plate 89 in order to retain the lever 25 in its uppermost position as shown in the dotted lines in Fig. 9.

By means of the slidable motor support and the manually operable control means therefor which have been described above, the motor of the device may be readily positioned either in or out of driving relation with the cutting unit as desired. For example, the spring 79 normally urges the supporting carriage 46 and the motor 21 carried thereon away from the drive shaft 51 thereby tightening the belt 58 between the pulleys 56 and 57. In this position, the motor 21 is in driving relation with the cutting reel 17 and the traction wheels 16, and the control lever 25 is in its lowermost or driving position as indicated in solid lines in Fig. 9. It will also be seen from Fig. 2 that when the carriage 46 is in its forward or driving position, the center of gravity of the motor 21 is disposed substantially over the axis of the wheels 16 thereby providing optimum traction between the wheels 16 and the ground under all operating conditions.

When the operator desires to disconnect the motor 21 from the cutting unit, the grasping portion 93 of the control lever 25 is pulled or moved upwardly toward the adjacent handle grip 64, usually by the same hand of the operator that grasps the handle grip, until the outwardly extending arm 96 of the clip 94 slips over and engages the upper linear edge of the face plate 89. In this uppermost or non-driving position the control wire 83, which is fastened to the forward end of the carriage 46, moves the carriage rearwardly or toward the drive shaft 51 thereby slackening the tension of the belt 58 to disconnect the motor 21 from driving relation with the cutting unit.

Referring now to Figs. 9 and 11, it will be seen that in order to shift the control lever 25 into its uppermost or non-driving position, both an upward and outward movement of the lever 25 must be effected. To facilitate such manipulation of the lever 25, the edge 97 of the face plate 89 adjacent the retaining clip 94 is shaped to function as a camming surface. Thus, the edge 97 of the plate 89 is curved outwardly in the direction of the right-hand handle member 63, as viewed in Fig. 9, and in the same plane as the handle structure, and the edge 97 is also rounded in a transverse plane as clearly seen in Fig. 11. By means of the curved and rounded edge 97 of the face plate 89, the contacting or engaging end of the leg 96 on the clip 94 is readily directed upwardly and outwardly over the surface of the plate 89 into non-driving position.

Another feature of my invention resides in the detachable mounting of the power unit on the cutting unit, which feature will best be understood by reference to Figs. 2, 7, and 8. A pair of inwardly extending mounting studs 98 are provided at the inner face of the side members 30 of the cutting unit. As shown in Fig. 2, one of the side brackets 28 is provided at its lowermost portion with a pair of edgewise slots 99 adapted to slidably receive the mounting studs 98 of its complementary side member 30. A locking or retaining plate 101 is disposed flatwise against the inner face of the lower portion of the side bracket 28, and in register with the slots 99 a pair of apertures 102 are provided in the retaining plate 101 through which the mounting studs 98 also extend (Fig. 8). A cap screw 103 extends outwardly through another opening 104 in the retaining plate 101 and engages a threaded opening 106 in the side bracket 28 for removably securing the retaining plate 101 to the side bracket 28. The side bracket 28 on the opposite side of the mower, as shown in Fig. 7, is provided with a pair of apertures 107, instead of the slots 99, adapted to receive the corresponding pair of mounting studs 98 extending from the inner face of the opposite side member 30.

To detach the power unit from the cutting unit, the chain 54 is disconnected and the screw 103 and the retaining plate 101 are removed from their side bracket 28. The bracket 28 having the slotted portions 99 may then be lifted from the mounting studs 98 after which the opposite side bracket 28 having the apertures 107 may be slipped sidewise from the studs 98 to completely detach the power unit.

In the operation of the power mower described above, the motor 21 is started with the control lever 25 pulled up in locked non-driving position on the handle 24. After the engine has had an opportunity to warm up, the mower may then be set in motion by releasing the control lever 25 into driving position. If at any time during the mowing operation, the operator desires to interrupt the forward movement of the mower, he can do so readily by manipulation of the lever 25 thereby stopping the cutting reel 17 and the wheels 16 without stopping the motor 21. Shifting of the control lever into locked non-driving position is readily accomplished with the same hand of the operator that grasps the adjacent handle grip 64, the camming surface on the face plate 89 coacting with the retaining clip 94 to facilitate upward and outward movement of the lever 25 in opposition to the force exerted by the spring 79. When the lever 25 is thus in locked non-driving position, the carriage 46 and motor 21 are pulled toward the rear of the device causing the belt 58 to slip and thereby stopping the reel 17 and the wheels 16. The control lever 25 may be released by pressing the same outwardly from the face plate 89 to disengage the clip 94 therefrom, and the tension of the spring 79 then pulls the carriage 46 and motor 21 forwardly thereby tightening the belt 58 and setting the cutting unit in motion. The action of the lever 25 may be adjusted by regulating the tension of the spring 79 and by varying the length of the control wire 83 projecting through the fitting 91.

In my device the position of the handle 24 relative to the rest of the mower does not affect the operation, and the motor 21 has its center of gravity disposed substantially over the axis of the wheels 16 when the carriage 46 is in its forward or driving position thereby affording maximum traction between the wheels and the ground. Therefore, the mower functions properly even when traversing relatively steep inclines.

As a result of the construction of the roller 32 in three separate roller sections, the device is readily adapted for easy trimming in difficult places and for turning the mower at the end of a cut without operating the control lever 25. This is accomplished by pressing down on the handle 24 to fulcrum the mower on the roller 32 and raise the wheels 16 off the ground in which position the mower may be manually propelled and maneuvered on the roller 32. Thus, it is unnecessary to manipulate the control lever 25 except when it is desired to disconnect the motor from the wheels and cutting reel for a somewhat longer period of time.

When the cutting unit requires sharpening or other maintenance work, the power unit may be simply and easily detached therefrom by removal of the retaining plate 101 and lifting the power unit off as hereinbefore described.

Although the invention has been described in detail with respect to a single specific embodiment, it will be understood that various modifications and equivalent structures may be substituted without departing from the scope of the invention as defined in the appended claims.

I claim:

1. Power transmission control means for a power lawn mower having traction wheels, a cutting reel, a motor, and releasable driving connections between the motor and the wheels and cutting reel, said control means comprising in combination an elongated handle structure for guiding the mower, a slidable support for the motor of the lawn mower, resilient means urging said support in one direction for positioning said motor in driving relation with the wheels and cutting reel, a flexible member connected at one end thereof to said support for sliding the latter in the opposite direction whereby to move said motor out of driving relation with the wheels and cutting reel, a control lever pivotally affixed at one end thereof to said handle structure and having a grasping portion for manually operating said lever, said flexible member having its opposite end secured to said lever whereby movement of said motor into and out of driving relation may be controlled by pivotal movement of said lever between driving and non-driving positions, and retaining means on said lever cooperating with said handle structure for releasably holding said lever in non-driving position.

2. Power transmission control means for a power lawn mower having traction wheels, a cutting reel, a motor, and releasable driving connections between the motor and the wheels and cutting reel, said control means comprising in combination an elongated handle structure for guiding the mower, a slidable support for the motor of the lawn mower, resilient means urging said support in one direction for positioning said motor in driving relation with the wheels and cutting reel, a flexible member connected at one end thereof to said support for sliding the latter in the opposite direction whereby to move said motor out of driving relation with the wheels and cutting reel, said handle structure comprising an elongated shank portion having a pair of oppositely branching handle members extending laterally from the outer end of said shank portion, a control lever pivotally attached at one end thereof to said handle structure between said handle members and having a grasping portion at its other end for operating said lever, said flexible member having its opposite end secured to said lever at an intermediate portion thereof for moving said motor into and out of driving relation by pivotal movement of said lever between driving and non-driving positions, and a retaining clip secured to said lever at an intermediate portion thereof, said clip having a projecting portion adapted to engage the outer end of said handle structure between said handle members for releasably retaining said lever in non-driving position.

3. Power transmission control means for a power lawn mower having traction wheels, a cutting reel, a motor, and releasable driving connections between the motor and the wheels and cutting reel, said control means comprising in combination an elongated handle structure for guiding the mower, a slidable support for the motor of the lawn mower, resilient means urging said support in one direction for positioning said motor in driving relation with the wheels and cutting reel, a flexible member connected at one end thereof to said support for sliding the latter in the opposite direction whereby to move said motor out of driving relation with the wheels and cutting reel, said handle structure comprising an elongated shank portion having a pair of oppositely branching handle members extending laterally from the outer end of said shank portion, a control lever pivotally attached at one end thereof to said handle structure adjacent the inner end of one of said handle members and having an operating portion at its other end, said operating portion being disposed adjacent the other of said handle members whereby said lever may be manipulated between driving and non-driving positions by one hand of an operator grasping said other handle member and said operating portion of said lever, said flexible member being secured at its opposite end to said lever at an intermediate portion thereof whereby said motor may be moved out of driving relation by movement of said operating portion of said lever toward said other handle member, and a retaining clip secured to said lever at an intermediate portion thereof, said clip having a projecting portion extending outwardly from said lever toward said handle structure and adapted to engage the outer end of said handle structure adjacent the inner end of said other handle member for releasably retaining said lever in non-driving position.

4. Power transmission control means for a power lawn mower having traction wheels, a cutting reel, a motor, and releasable driving connections between the motor and the wheels and cutting reel, said control means comprising in combination an elongated handle structure for guiding the mower, a slidable support for the motor of the lawn mower, resilient means urging said support in one direction for positioning said motor in driving relation with the wheels and cutting reel, a flexible member connected at one end thereof to said support for sliding the latter in the opposite direction whereby to move said motor out of driving relation with the wheels and cutting reel, said handle structure comprising an elongated shank portion having a pair of oppositely branching handle members extending laterally from the outer end of said shank portion, a control lever pivotally attached at one end thereof to said handle structure adjacent the outer end of the latter, a grasping portion at the opposite end of said lever for operating the same, said flexible member having its opposite end secured to said lever at an intermediate portion thereof whereby said motor may be moved into and out of driving relation by pivotal manipulation of said lever between driving anad non-driving positions, an L-shaped retaining clip mounted on said lever at an intermediate portion thereof and having one leg thereof projecting toward said handle structure, said leg being adapted to engage the outer end of said handle structure for releasably retaining said lever in non-driving position, and a camming surface on said handle structure adjacent the juncture of said shank with said handle members, said camming surface being curved outwardly in the plane of said handle structure and being rounded in a transverse plane, and said leg of said retaining clip being adapted to engage said camming surface during shifting of said lever from driving to non-driving positions whereby to facilitate movement of said lever into releasably retained non-driving position.

5. Power transmission control means for a motor driven lawn mower comprising in combination a supporting framework rigidly mountable on the mower and having a drive shaft operably connected with the wheels and cutting reel of the mower, a belt for drivingly connecting said shaft with the motor of the lawn mower, a handle for guiding said mower, an elongated base mounted transversely of said drive shaft and having an elongated slot therein, a pair of laterally spaced upright rails mounted on said base, a motor-supporting plate slidably disposed on said rails for longitudinal movement relative to said base, a spring coacting with one end of said slot and one end of said plate for resiliently urging said plate toward one end of said base away from said drive shaft whereby to tighten said belt, a flexible member having one end thereof extending through said slot and secured to the opposite end of said plate for moving said plate toward the opposite end of said base and toward said drive shaft whereby to loosen said belt, a control lever pivotally mounted on said handle, said flexible member having its opposite end secured to said lever whereby the tension of said belt may be controlled by pivotal movement of said lever between driving and non-driving positions, and retaining means on said lever coacting with said handle for releasably holding said lever in non-driving position.

6. Power transmission control means for a power lawn mower having a swingably mounted handle, traction wheels, a cutting reel, a motor, and releasablye driving connections between the motor and the wheels and cutting reel, said control means comprising in combination an elongated base mountable on the mower, a motor-supporting plate slidably disposed on said base for longitudinal movement relative thereto, a tension spring coacting with said base and said plate for resiliently urging said plate toward one end of said base whereby to position the motor in driving relation with the wheels and cutting reel, and a manually actuated flexible member extending along the handle of the mower and being operably connected to said plate for moving said plate toward the opposite end of said base whereby to shift the motor out of said driving relation, said manually actuated flexible member extending substantially through the axis of swinging of the handle whereby longitudinal movement of the flexible member upon swinging of the handle is substantially avoided.

7. Power transmission control means for a power lawn mower having traction wheels, a cutting reel, a motor, and releasable driving connections between the motor and the wheels and cutting reel, said control means comprising in combination an elongated base rigidly mountable intermediate the traction wheels of the mower and having an elongated slot therein, a pair of laterally spaced upright rails mounted longitudinally on said base, a motor-supporting plate slidably disposed on said rails for longitudinal movement relative to said base, spring means coacting with one end of said slot and one end of said plate for resiliently urging the latter toward one end of said base whereby to position the motor in driving relation with the wheels and cutting reel, and manually operable actuating means including a flexible member extending through said slot and secured to the other end of said plate for shifting said plate toward the other end of said base with the motor in non-driving relation.

HAROLD T. BRIGHT.

References Cited in the file of this patent

UNITED STATES PATENTS

| Number | Name | Date |
| --- | --- | --- |
| 1,554,744 | Mack | Sept. 22, 1925 |
| 1,966,972 | Seely | July 17, 1934 |
| 2,082,600 | Squires et al. | June 1, 1937 |
| 2,166,450 | Smalley | July 18, 1939 |
| 2,196,892 | Berndt | Apr. 9, 1940 |
| 2,260,344 | Shaw | Oct. 28, 1941 |
| 2,313,590 | Sherer et al. | Mar. 9, 1943 |
| 2,335,054 | Godwin | Nov. 23, 1943 |
| 2,453,819 | Smith | Nov. 16, 1948 |
| 2,545,781 | Hesterberg | Mar. 20, 1951 |

FOREIGN PATENTS

| Number | Country | Date |
| --- | --- | --- |
| 26,950 | Great Britain | Nov. 17, 1904 |
| 113,592 | Australia | July 31, 1941 |